United States Patent
Zeller

4,066,336
Jan. 3, 1978

[54] ELECTRODE FOR A CONTROLLABLE ELECTROCHROMIC INDICATOR DEVICE AND METHOD OF MANUFACTURE

[75] Inventor: Hans Rudolf Zeller, Birr, Switzerland

[73] Assignee: BBC Brown Boveri & Company Limited, Baden, Switzerland

[21] Appl. No.: 645,430

[22] Filed: Dec. 30, 1975

[30] Foreign Application Priority Data
Jan. 6, 1975 Switzerland .................. 63/75

[51] Int. Cl.² ............................................. G02F 1/36
[52] U.S. Cl. ............................................. 350/160 R
[58] Field of Search ................... 350/160, 161 R; 340/324 M

[56] References Cited
U.S. PATENT DOCUMENTS

| | | | |
|---|---|---|---|
| 3,844,636 | 10/1974 | Maricle et al. | 350/160 R |
| 3,944,333 | 3/1976 | Leibowitz | 350/160 R |

*Primary Examiner*—William L. Sikes
*Attorney, Agent, or Firm*—Oblon, Fisher, Spivak, McClelland & Maier

[57] ABSTRACT

Electrode for a controllable electrochromic indicator device with an electrochromic layer between a transparent first and a second electrode, the second electrode having a porous solid impregnated with a liquid electrolyte.

41 Claims, 1 Drawing Figure

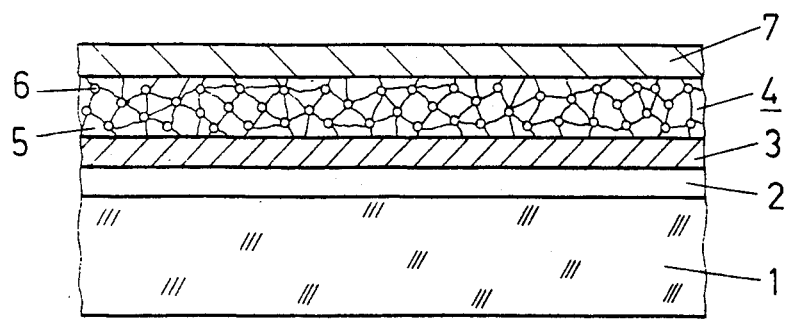
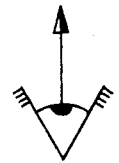

ELECTRODE FOR A CONTROLLABLE ELECTROCHROMIC INDICATOR DEVICE AND METHOD OF MANUFACTURE

BACKGROUND OF THE INVENTION

1. Field of the Invention

The present invention concerns an electrode for a controllable, electrochromic indicator device with an electrochromic layer between a transparent first and a second electrode.

2. Description of the Prior Art

Electrodes of the mentioned type are already known from the publications DT-OS 2,125,337; DT-OS 2,201,104; DT-OS 2,201,139 and DT-OS 2,363,306. Such electrodes exhibit a layer of liquid electrolyte and are so arranged in the electrochromic indicator devices that under the action of an electric field through the liquid electrolyte contacting the electrochromic layer a rapid and uniform change in the absorption characteristic is produced over large areas of the electrochromic material, and, thus, a rapid and uniform indication is made possible. Since such indicator devices are preferably in the form of large-area cells, the sealing of these cells presents considerable difficulties. Leaking of the cells, however, is to be avoided, since the loss of liquid electrolyte not only affects the operation of the indicator devices, but, also, can foul surrounding devices and even destroy them when high proton-content electrolytes like sulfuric acid are used.

SUMMARY OF THE INVENTION

It is an aim of the invention, therefore, to produce a controllable electrochromic indicator device which has the advantages of all known electrodes for electrochromic indicator devices with liquid electrolytes, and which, additionally, gives the indicator device especially high reliability and long life and can be fabricated simply and economically.

This indicated aim is achieved by the invention by providing as an electrode a porous solid impregnated with a liquid electrolyte.

In the fabrication method of the invention, the porous solid is etched out of a multicomponent substance and then impregnated with a liquid electrolyte.

By the use of such electrodes in electrochromic indicator devices, the bothersome hermetic sealing of electrochromic cells with a liquid electrolyte layer is almost completely avoided, since the liquid is held in the pores of the solid by capillary forces and can escape only by the action of powerful external influences such as vibration and gross changes in temperature. It has proved to be particularly advantageous in this regard to choose the average pore diameter between 20 and 200A, with a porosity greater than 25% being desirable.

A very suitable solid material is one with silicate structure, perhaps a multicomponent glass, since it is easy to etch a component from this with a solvent, leaving a porous silicate skeleton which can absorb electrolyte liquid, but, which at the same time, because of its chemical inertness, can also withstand aggressive electrolytes such as strong acids.

To obtain good optical contrast in the indicator device, it is advantageous to use a colored solid or to color it, preferably, a color complementary to that of the electrochromic layer, e.g. yellow in the case of tungsten trioxide. Coloring can be effected, for example, by the incorporation of metal ions, inorganic or organic pigments or dyes as well as reticular or dotted metal films into the porous solid.

The fabrication of controllable electrochromic indicator devices is greatly simplified by the use of porous solids. The difficulty, especially in the case of large indicator areas, of spacing the electrochromic layer from the back of the cell to obtain a uniform electrolyte layer disappears, since the layer of porous solid itself acts as the spacer and, indeed, gives a very uniform spacing. Hermetic closure is likewise made easier, since any exchange of gas or liquid is blocked merely by applying a layer, such as a metal film, impervious to gas and liquid, to the outside of the porous solid.

BRIEF DESCRIPTION OF THE DRAWINGS

Various objects, features and attendant advantages of the present invention will be more fully appreciated as the same becomes better understood from the following detailed description of the present invention when considered in connection with the accompanying drawing, in which:

The FIGURE shows a section through an electrochromic indicator device with the electrode of the invention.

DETAILED DESCRIPTION OF A PREFERRED EMBODIMENT

In the FIGURE are shown on a carrier plate 1 layers, labeled with the numbers 2–7, of tin dioxide ($SnO_2$) 2, tungsten trioxide ($WO_3$) 3, Vicor glass 5, the opened pores of which are filled with 1-molar sulfuric acid 6, and lead 7. The sulfuric acid impregnated Vicor glass constitutes an electrolyte electrode 4.

Glass is used for the carrier plate 1, but other transparent materials, such as clear plastic, are also suitable. The few $\mu$ thick tin dioxide layer 2 on the glass carrier plate 1 is transparent and serves as the first electrode. The next layer 3 of tungsten trioxide, about 5 $\mu$ thick, is colorless before the application of a d.c. voltage to the electrode layers 2, 4 and is used as the electrochromic indicator layer. Second electrode 4 comprises the 1-molar sulfuric acid impregnated matrix of about 1 mm thick Vicor glass, the pores of which are between 30 and 100 A in diameter and the porosity of which is about 40%. The sulfuric acid may be in the range of 0.1–10.0 sulfuric acid. The final layer 7 of about 0.2 mm thickness of lead serves as an electrical contact and as a hermetic seal of electrolyte electrode 4.

The second electrode 4 is made by first opening the pores in the Vicor glass 5 by etching the glass for one hour in hydrofluoric acid. The residual acid and etching products are then removed by washing in distilled water and acetone and the treated glass 5 is dried. However, the impregnation with electrolyte 6 is not done until the Vicor glass is incorporated into the indicator device.

For this, the glass 5 is first laid on the electrochromic layer 3 and then it is hermetically sealed by evaporation of a lead film about 0.2 mm thick onto its outer surface. For introduction of the electrolyte 6, however, a filler hole, not shown in the FIGURE, is left at the edge or on the back of the porous glass layer 5 and is soldered shut with lead after impregnation of the porous glass with 1-molar sulfuric acid under vacuum.

An indicator device with a porous and sulfuric acid impregnated solid electrode can be operated with 10 V. d.c. If the tin dioxide electrode 2 is negative and the lead coating 7 is positive, then the electrochromic layer 3 turns blue. When the polarity is reversed, the electrochromic layer loses its color.

Such indicator devices exhibit a uniform coloration of the electrochromic layer because the latter is uniformly wetted with sulfuric acid, upon application of the electric field, protons diffuse from the sulfuric acid into the tungsten trioxide and produce a blue color by forming a tungsten bronze $H_xWO_3$, where $x < 0.3$. The coloring or decoloring rate can be increased by raising the applied d.c. voltage.

Ion-providing metal salt solutions can also be used as the electrolyte, along with proton-supplying strong acids. Especially suitable are solutions of lithium salts, like $LiClO_4$ and $LiCl$, in organic solvents such as propylene carbonate, tetrahydrofuran and 1,2-dimethoxyethane. If necessary, the solubility of the lithium salts can be increased by adding a suitable complexing agent such as $AlCl_3$. The most important thing in using such electrolytic solutions is that the metal ions form bronzes with the electrochromic substance to produce coloration.

For the solid, any porous substance compatible with the electrolyte can be used, including multicomponent systems with a silicate structure such as glasses with weakly resistant additives that can be removed by acid or lye treatment to produce a porous solid.

The sealing material 7 of the cell can be, besides lead, any electrically conducting substance compatible with the electrolyte that hermetically seals.

Instead of tungsten trioxide, any other electrolyte-compatible electrochromic substance can be used, e.g., molybdenum trioxide or mixtures of tungsten and molybdenum trioxides.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. Electrode for a controllable electrochromic indicator device with an electrochromic layer between a transparent first and a second electrode, the second electrode comprising a porous solid impregnated with a liquid electrolyte to form a single layer second electrode, an electrical contact connected to the second electrode.

2. Electrode as in claim 1 wherein the average pore diameter of the solid lies between 20 and 200 Å and the porosity is greater than 25%.

3. Electrode as in claim 2 wherein the porous solid is impregnated with a strong acid.

4. Electrode as in claim 2 wherein the porous solid is impregnated with solutions of lithium salts in organic solvents.

5. Electrode as in claim 2 wherein the porous solid is impregnated with sulfuric acid.

6. Electrode as in claim 2 wherein the porous solid comprises a silicate structure.

7. Electrode as in claim 6 wherein the poroud solid is impregnated with a strong acid.

8. Electrode as in claim 6 wherein the porous solid is impregnated with solutions of lithium salts in organic solvents.

9. Electrode as in claim 6 wherein the porous solid is impregnated with sulfuric acid.

10. Electrode as in claim 6 wherein the porous solid comprises glass.

11. Electrode as in claim 10 wherein the porous solid is impregnated with a strong acid.

12. Electrode as in claim 10 wherein the porous solid is impregnated with solutions of lithium salts in organic solvents.

13. Electrode as in claim 10 wherein the porous solid is impregnated with sulfuric acid.

14. Electrode as in claim 10 wherein the porous solid predominantly comprises a silicate skeleton of a soft alkali glass.

15. Electrode as in claim 14 wherein the porous solid is impregnated with a strong acid.

16. Electrode as in claim 14 wherein the porous solid is impregnated with solutions of lithium salts in organic solvents.

17. Electrode as in claim 14 wherein the porous solid is impregnated with sulfuric acid.

18. Electrode as in claim 1 wherein the porous solid is colored with organic and inorganic dyes as well as with metals.

19. Electrode as in claim 18 wherein the porous solid is impregnated with a strong acid.

20. Electrode as in claim 18 wherein the porous solid is impregnated with solutions of lithium salts in organic solvents.

21. Electrode as in claim 18 wherein the porous solid is impregnated with sulfuric acid.

22. Electrode as in claim 1 wherein the porous solid is impregnated with a strong acid.

23. Electrode as in claim 1 wherein the porous solid is impregnated with solutions of lithium salts in organic solvents.

24. Electrode as in claim 23 wherein the porous solid is impregnated with a solution of $LiClO_4$ in propylene carbonate.

25. Electrode as in claim 23 wherein the porous solid is impregnated with a solution of $LiClO_4$ in tetrahydrofuran.

26. Electrode as in claim 23 wherein the porous solid is impregnated with a solution of $LiClO_4$ in 1,2-dimethoxyethane.

27. Electrode as in claim 23 wherein the porous solid is impregnated with a solution of $LiCl$ in propylene carbonate.

28. Electrode as in claim 23 wherein the porous solid is impregnated with a solution of $LiCl$ in tetrahydrofuran.

29. Electrode as in claim 23 wherein the porous solid is impregnated with a solution of $LiCl$ in 1,2-dimethoxyethane.

30. Electrode as in claim 1 wherein the electrical contact comprises a cover layer comprising a metal.

31. Electrode as in claim 1 wherein the porous solid is colored with organic and inorganic dyes as well as with metal ions.

32. Electrode as in claim 1 wherein the porous solid is colored with pigments as well as with metals.

33. Electrode as in claim 1 wherein the porous solid is colored with pigments as well as with metal ions.

34. Electrode as in claim 1 wherein the porous solid is impregnated with sulfuric acid.

35. Electrode as in claim 1 wherein the porous solid is impregnated with solutions of lithium salts in organic solvents with a complexing agent.

36. Electrode as in claim 1 wherein the porous solid is impregnated with solutions of lithium salts in organic solvents with $AlCl_3$.

37. Electrode as in claim 1 wherein the electrical contact comprises a cover layer comprising Pb.

38. Method of fabricating an electrode for a controllable electrochromic indicator device with an electrochromic layer between a transparent first and a second electrode, an electrical contact connected to the second electrode, the second electrode comprising a porous solid impregnated with a liquid electrolyte to form a single layer second electrode, the method comprising: etching out a multicomponent substance to form the porous solid and impregnating the porous solid with a liquid electrolyte to form a single layer second electrode.

39. Method as in claim 38 wherein the alkali-constituent of a soft alkali glass is etched out with a hot acid such as hydrofluoric acid and the resultant porous solid is washed, dried and impregnated under vacuum with 0.1–10 molar sulfuric acid.

40. Method as in claim 39 wherein before the impregnation a hermetically sealing and electrically conducting layer is applied to the outer side of the porous solid to form the electrical contact.

41. Method as in claim 38 wherein before the impregnation a hermetically sealing and electrically conducting layer is applied to the outer side of the porous solid to form the electrical contact.

* * * * *